(12) United States Patent
Shental et al.

(10) Patent No.: US 7,311,288 B2
(45) Date of Patent: Dec. 25, 2007

(54) AIRCRAFT WING STRUCTURE AND A METHOD FOR DECREASING FLIGHT SPEED OF THE AIRCRAFT

(75) Inventors: Gad Shental, Holon (IL); Nir Shental, Kiryat Savyonim-Yahud (IL); Ran Shental, Holon (IL); Lev Pessachis, Zoran (IL)

(73) Assignee: Top I Vision, Ltd., Holon (IL)

( * ) Notice: Subject to any disclaimer, the term of this patent is extended or adjusted under 35 U.S.C. 154(b) by 332 days.

(21) Appl. No.: 10/998,690

(22) Filed: Nov. 29, 2004

(65) Prior Publication Data

US 2005/0151031 A1    Jul. 14, 2005

(30) Foreign Application Priority Data

Dec. 4, 2003    (IL) ...................................... 159186

(51) Int. Cl.
*B64C 3/54*    (2006.01)
(52) U.S. Cl. ........................ 244/213; 244/218
(58) Field of Classification Search ................ 244/215, 244/216, 217, 212, 213, 218, 219, 210, 211, 244/198, 49
See application file for complete search history.

(56) References Cited

U.S. PATENT DOCUMENTS

| | | | | |
|---|---|---|---|---|
| 1,828,161 | A | | 10/1931 | Suchofsky |
| 2,156,403 | A | * | 5/1939 | Riviere ........................ 244/215 |
| 2,239,854 | A | | 4/1941 | McCormick |
| 4,566,657 | A | * | 1/1986 | Grow ......................... 244/90 A |
| 4,614,320 | A | * | 9/1986 | Rutan .......................... 244/216 |
| 4,796,840 | A | * | 1/1989 | Heynatz ...................... 244/215 |
| 4,881,703 | A | | 11/1989 | Nahas |
| 5,236,149 | A | * | 8/1993 | MacKay ...................... 244/7 C |
| 6,742,741 | B1 | * | 6/2004 | Rivoli ......................... 244/12.1 |
| 7,014,142 | B2 | * | 3/2006 | Barocela et al. ............. 244/7 R |

FOREIGN PATENT DOCUMENTS

DE    255936    12/1910

* cited by examiner

*Primary Examiner*—Timothy D. Collins

(57) ABSTRACT

The invention provides a wing structure for an aircraft, including a top skin and a bottom skin defining a primary wing surface, the surface having a width, a length, a leading edge and a trailing edge; a flap having a width smaller than the width of the wing surface and a length extending over a major portion of the wing length, the flap being hingedly joined adjacent to the trailing edge of the wing, wherein the flap is capable of assuming two limit dispositions, a first disposition in which the flap extends substantially parallel to the bottom skin, and a second disposition extending towards the trailing edge of the wing, at an obtuse angle. A method for slowing down the speed of flight of an aircraft is also provided.

14 Claims, 2 Drawing Sheets

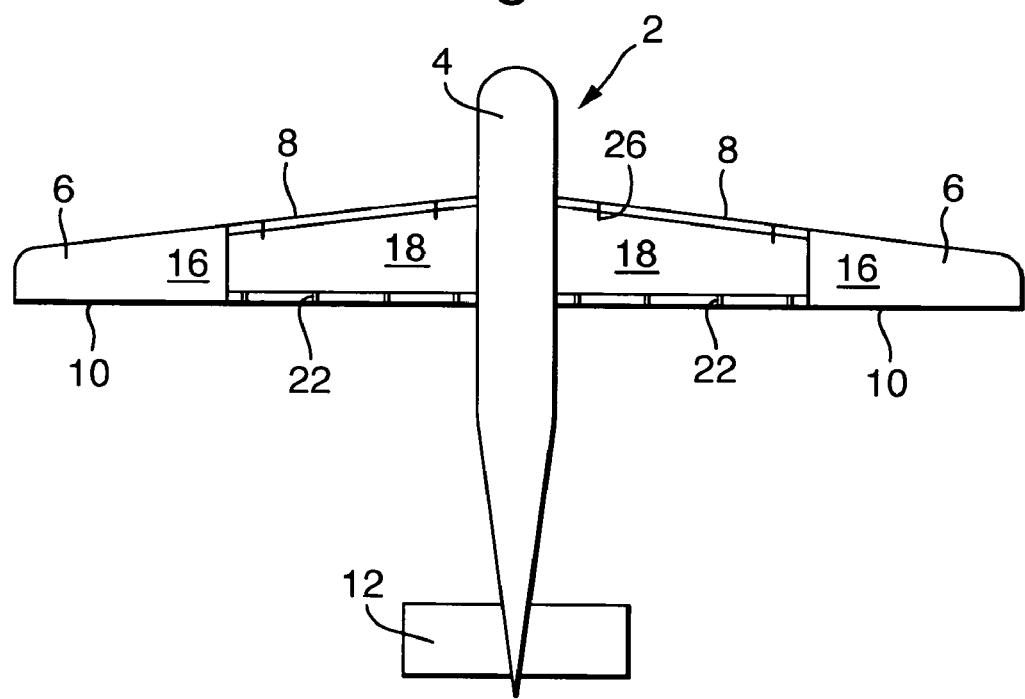
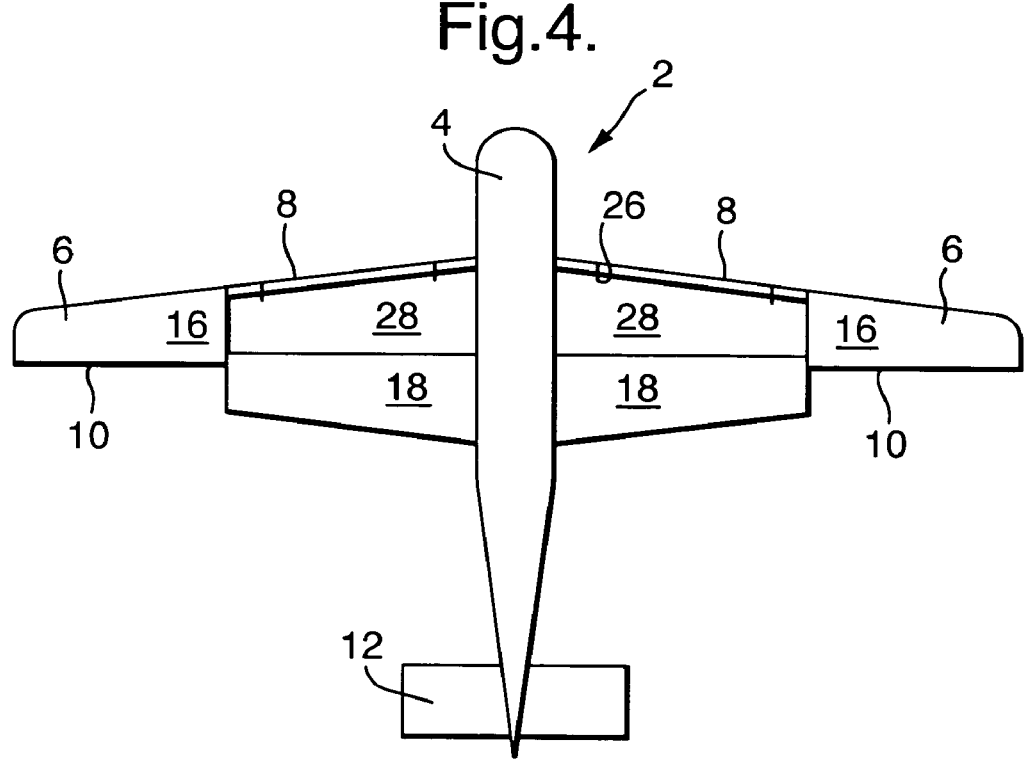

AIRCRAFT WING STRUCTURE AND A METHOD FOR DECREASING FLIGHT SPEED OF THE AIRCRAFT

FIELD OF THE INVENTION

The present invention relates to aircraft structure and flight speed control and more particularly to an aircraft wing structure, a moveable member on an aircraft wing and a method for slowing down the speed of travel of an aircraft during flight.

The invention is specifically useful when implemented in lightweight and unmanned aircrafts.

BACKGROUND OF THE INVENTION

Slowing down the speed of travel of aircrafts, especially before or during landing, is generally accomplished by control surfaces located on the leading and trailing edges of the wings used to increase and decrease wing lifts and by other well-known, conventional means and methods and the combinations thereof. Such control surfaces are designed and operate to vary the camber of the wing and are adapted to rotate relative to the trailing edge of the wing. Slowing down the speed of flight is effected gradually under constant control, based on flight data, which is continuously monitored and processed.

DISCLOSURE OF THE INVENTION

It is a broad object of the present invention to provide a wing structure, a moveable member and a method for abruptly slowing down the speed of flight of an aircraft.

It is a further object of the present invention to provide a wing structure, a moveable member and a method for slowing down the speed of flight of an aircraft by substantially increasing the effective surface area of the wing structure, thereby increasing the lift and drag on the wing.

It is yet a further object of the present invention to provide a wing structure, a moveable member and a method for slowing down the speed of flight of an aircraft, facilitating landing on a shorter runway and/or on a poorly or unpaved runway.

In accordance with the present invention, there is therefore provided a wing structure for an aircraft, comprising a top skin and a bottom skin defining a primary wing surface, said surface having a width, a length, a leading edge and a trailing edge; a flap having a width smaller than the width of the wing surface and a length extending over a major portion of said wing length, said flap being hingedly joined adjacent to said trailing edge of the wing, wherein said flap is capable of assuming two limit dispositions, a first disposition in which said flap extends substantially parallel to the bottom skin, and a second disposition extending towards said trailing edge of the wing, at an obtuse angle.

The invention further provides a moveable member on an aircraft including an aerodynamic body, wings each having a bottom surface, a width, a length, leading and trailing edges and tail structures, said moveable member comprising at least a semi-rigid flap having a width smaller than the width of the said wings and a length extending over a major portion of said wing length; said flap being hingeably joined adjacent to the trailing edge of a wing allowing it to assume two limit dispositions, a first disposition in which the flap extends substantially parallel to the bottom surface of the wing and a second disposition in which said flap, being hinged at its leading edge, extends towards the tail of the aircraft at an obtuse angle with respect to said bottom surface.

The invention also provides a method for slowing down the speed of flight of an aircraft, comprising providing at least one moveable member including at least a semi-rigid flap hingeably joined to a wing of said aircraft; releasably affixing said flap in a first disposition in which said flap extends substantially parallel to said wing, and when the speed of the aircraft is to be slowed down, releasing said flap so as to allow it to swing about the hinge at its leading edge and to assume a second disposition in which said flap extends towards the tail of said aircraft at an obtuse angle with respect to said wing.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic cross-sectional view of a wing structure and a moveable member of an aircraft in a closed disposition, according to the present invention;

Figure 1:
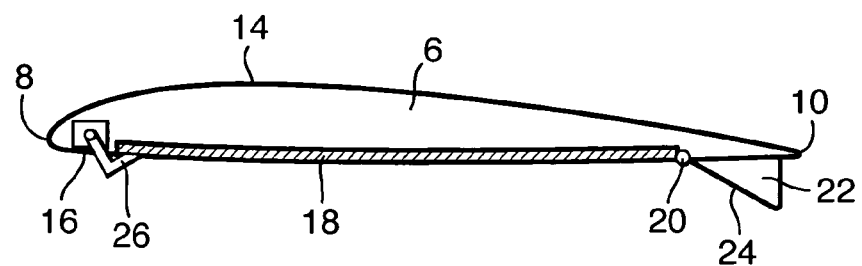
Figure 2:
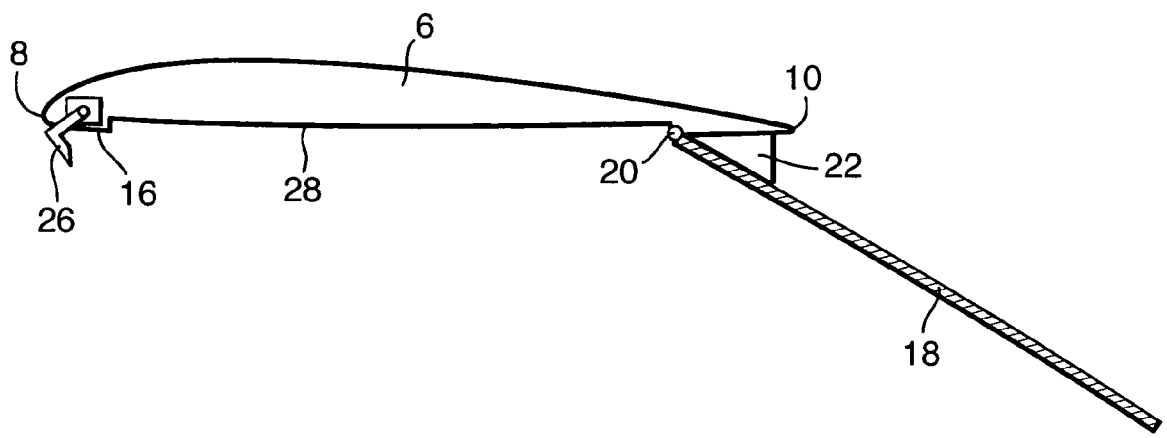

FIG. 2 a schematic cross-sectional view of a wing structure and a moveable member of FIG. 1, in an open disposition;

FIG. 3 is a schematic bottom view of an aircraft fitted with the wing structure and moveable member in a closed disposition, according to the present invention, and FIG. 4 is a schematic bottom view of an aircraft fitted with the wing structure and moveable member in an open disposition.

DETAILED DESCRIPTION OF PREFERRED EMBODIMENTS

The wing structure and moveable member for lightweight or unmanned aircraft 2 according to a preferred embodiment of the present invention is illustrated in FIGS. 1-4. Seen in side cross-sectional views and views from the bottom of the aircraft 2, are the aircraft fuselage 4, the aircraft wings 6, each having a leading edge 8 and a trailing edge 10. Also illustrated is the aircraft tail 12. The wing 6 is constituted by a top skin 14 and a bottom skin 16, defining a primary wing surface having a width and a length. Further seen in the Figures is a flap 18, hingedly joined by means of one or more suitable hinges 20 to the bottom skin 16 of each wing 6. Adjacent to the bottom skin 16 of the trailing edge 10 of the wing 6 there are affixed one or more abutments 22, configured with a surface 24, defining an obtuse angle with the bottom skin 16 of the wing 6. In a first disposition of the flap 18 (FIGS. 1 and 3), the flap 18 extends substantially parallel to the bottom skin 16 and is held in position by at least one releasable detent 26, e.g., a pivotable hook or a linearly displaceable latch, electrically activatable by a solenoid. Advantageously, the bottom skin 16 of the wing 6 is formed with a recess 28 (FIGS. 2 and 4) for accommodating the panel 18 therein in the first disposition shown in FIGS. 1 and 3. In the second disposition (FIGS. 2 and 4), the panel 18, hinged at its leading edge, is released from the detent 26 and swung about the hinge 20 until it abuts against surface 24 of the abutment 22.

Thus, in operation, during take-off and flight, the panel 18 is in its first disposition, constituting a bottom surface portion of the wing 6, as shown in FIGS. 1 and 3. When the speed of flight is to be reduced, e.g., before landing, the detents 26 are activated, thereby causing the panels 18 to be released. Due to gravity and air flow, the panels are swung towards the tail 12 of the aircraft, until they reach and hit against the abutment surface 24. As seen in FIGS. 2 and 4, in this state the panels 18 effectively form additional surface areas of the wings, increasing the lift and drag on the fixed wings caused by the abrupt change in the speed of travel of the aircraft, due to the change in the configuration and surface area of the wings. The latter effectively shifts the lifting center towards the trailing edge of the wing 6, thereby avoiding stalling of the aircraft.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A wing structure for an aircraft, comprising:
    a top skin and a bottom skin defining a primary wing surface, said surface having a width, a length, a leading edge and a trailing edge;
    at least one abutment surface connected to the trailing edge;
    a flap having a width smaller than the width of the wing surface and a length extending over a major portion of the length;
    said flap being hingedly joined adjacent to the trailing edge;
    wherein said flap is capable of assuming two limit dispositions, a first disposition in which said flap extends substantially parallel to the bottom skin, and a second disposition extending towards the trailing edge at an obtuse angle and contacting the abutment surface; and
    a detent means for maintaining the flap at said first disposition;
    wherein movement of said flap from the first disposition to the second disposition is effected by gravity and air flow upon release of the detent means.

2. The wing structure as claimed in claim 1, wherein said detent means is at least one pivotable hook attached adjacent to the leading edge of the wing.

3. The wing structure as claimed in claim 1, wherein said abutment has a surface defining said obtuse angle.

4. The wing structure as claimed in claim 1, wherein said bottom skin has a recess for at least partly accommodating said flap in its first position.

5. The wing structure as claimed in claim 1, wherein said detent means is electrically activatable.

6. A moveable member on an aircraft including an aerodynamic body, and wings, each wing having a bottom surface, a width, a length, leading and trailing edges and tail structures, said moveable member comprising:
    an abutment surface connected to the trailing edge of the wing; and
    at least a semi-rigid flap having a width smaller than the width of the wings and a length extending over a major portion of the wing length,
    said flap being hingeably joined adjacent to the trailing edge of a wing allowing it to assume two limit dispositions, a first disposition in which the flap extends substantially parallel to the bottom surface of the wing and a second disposition in which said flap, being hinged at its leading edge, extends towards the tail of the aircraft at an obtuse angle with respect to said bottom surface, and contacts said abutment surface, movement of the flap from said first disposition to the second disposition being effected by gravity and air flow.

7. The moveable member as claimed in claim 6, further comprising releasable detent means for maintaining said flap in the first disposition and for releasing it to allow movement to the second disposition.

8. The moveable member as claimed in claim 6, further comprising at least one abutment connected to the bottom surface of the trailing edge of said wings, said abutment having a surface defining the second disposition.

9. The moveable member as claimed in claim 6, wherein in said first disposition said flap is at least partly accommodated in a recess made in the bottom surface of the wing.

10. The moveable member as claimed in claim 7, wherein said detent means is electrically activatable to release said flap.

11. A method for slowing down the speed of flight of an aircraft, comprising:
    providing at least one moveable member including at least a semi-rigid flap hingeably joined to a wing of said aircraft;
    providing at least one abutment surface connected to the trailing edge of the wing,
    releasably affixing said flap in a first disposition in which said flap extends substantially parallel to said wing, and
    when the speed of the aircraft is to be slowed down, releasing said flap so as to allow it to swing about the hinge at its trailing edge and to assume a second disposition by gravity and air flow, in which said flap extends towards the tail of said aircraft at an obtuse angle with respect to said wing and contacts said abutment surface.

12. The method as claimed in claim 11, wherein said flap is releasably affixed in said first disposition by means of at least one pivotable hook.

13. The method as claimed in claim 11, wherein said flap is releasably affixed by means of electrically actuatable detent means.

14. The method as claimed in claim 13, wherein said electrically actuatable detent means comprises a solenoid.

\* \* \* \* \*